United States Patent [19]

Hammer

[11] 4,164,130
[45] Aug. 14, 1979

[54] ONE-WAY CLUTCH FOR DOUBLE-ACTING AGITATOR

[75] Inventor: Richard G. Hammer, Kansas, Ohio

[73] Assignee: Whirlpool Corporation, Benton Harbor, Mich.

[21] Appl. No.: 891,533

[22] Filed: Mar. 30, 1978

[51] Int. Cl.² .................. D06F 13/06; F16D 11/00
[52] U.S. Cl. .................................. 68/133; 192/46
[58] Field of Search ............... 68/133, 134; 192/46

[56] References Cited

U.S. PATENT DOCUMENTS

| | | | |
|---|---|---|---|
| 2,224,935 | 12/1940 | Schultz | 192/45.1 |
| 2,542,323 | 2/1951 | Gearhart | 192/45.1 |
| 3,236,345 | 2/1966 | Dietz | 192/45.1 |
| 3,581,857 | 6/1971 | Dallman | 192/41 |
| 3,987,652 | 10/1976 | Ruble | 68/134 |

*Primary Examiner*—Philip R. Coe
*Attorney, Agent, or Firm*—Hill, Van Santen, Steadman, Chiara & Simpson

[57] ABSTRACT

An agitator for a washing machine of the vertical axis type has an upper auger portion with a helical vane thereon and a coaxial lower skirt portion having upstanding agitation and scrubbing vanes thereon. The lower portion is driven in to and fro oscillations, while the upper portion is driven in stepwise, unidirectional rotations through a one-way, non-ratcheting clutch. The clutch has a double-lobed, cam carried with the lower, oscillating portion of the agitator. A pair of clutch members carried radially outwardly of the cam are each engageable on a spiral surface thereof with a corresponding thrusting surface of each of the cam lobes and on a generally radially extending surface with a capture and retraction surface of each cam lobe. Teeth on the outer portions of the clutch members and on an inner surface of the auger portion are selectively forcibly engaged on the driving oscillation and are positively disengaged on the reverse oscillation, to provide the desired one-way drive to the auger element.

10 Claims, 6 Drawing Figures

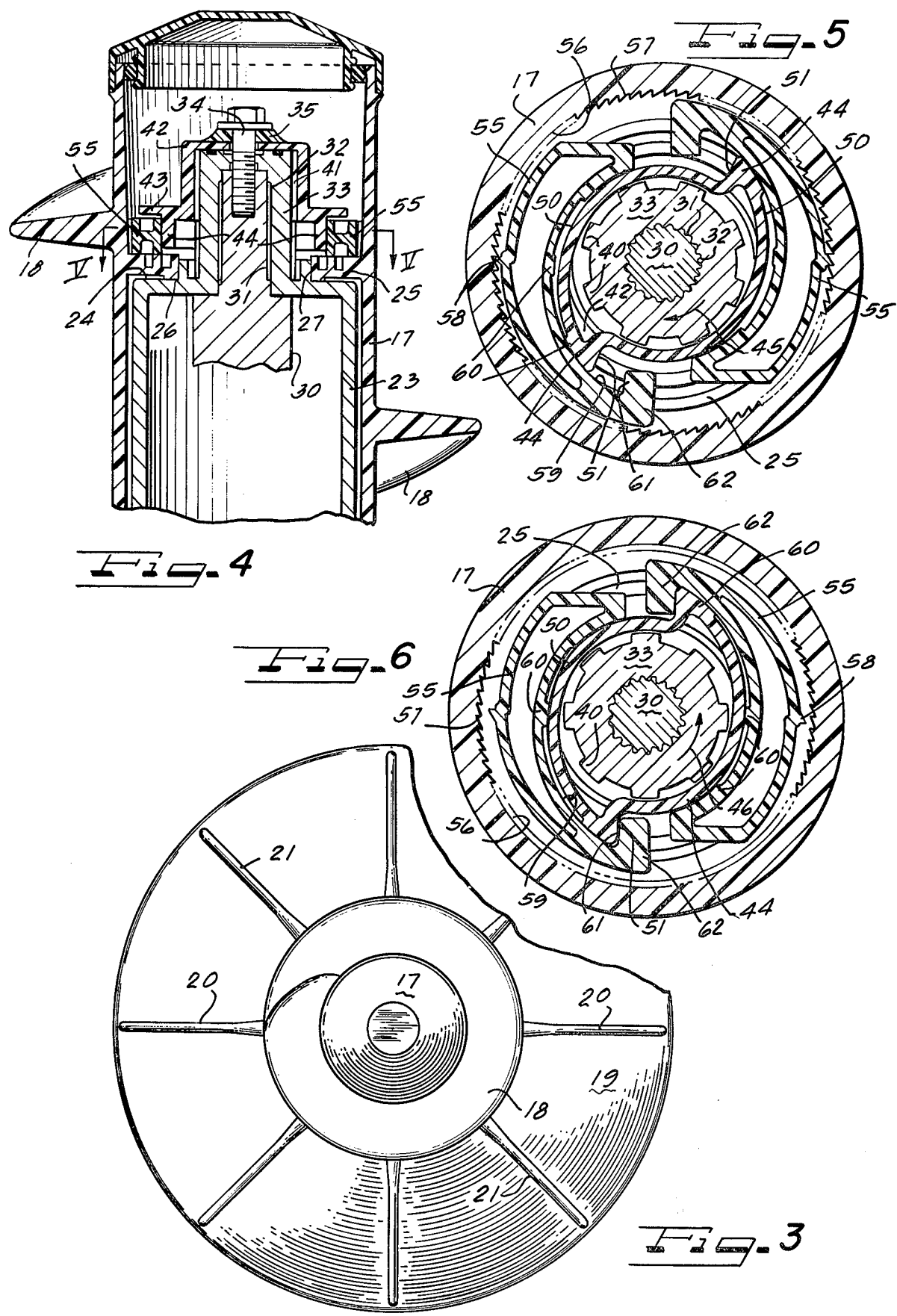

ONE-WAY CLUTCH FOR DOUBLE-ACTING AGITATOR

BACKGROUND OF THE INVENTION

1. Field of the Invention

The present invention relates generally to washing machine agitator constructions and more specifically to a clutch construction arranged for driving a first member in one rotational direction and a second coaxial member in to and fro oscillations.

2. The Prior Art

Double-acting agitators for effecting positive toroidal rollover of even very heavy loads of laundry in a vertical axis washing machine are disclosed in U.S. Pat. Nos. 3,987,508, 3,987,651 and 3,987,652, all assigned to the same assignee as the present invention. The devices of these patents employ one-way clutches, for example a ratcheting clutch as in the Ruble U.S. Pat. No. 3,987,652.

U.S. Pat. No. 3,581,857 shows a one-way centrifugal clutch within a pair of clutch members are rotated with a drive shaft of a reversible motor. In one direction of rotation, clutch members are centrifuged outwardly and against a driven surface 14. In the opposite direction, arm members engage in sockets of the clutch members and draw them inwardly and out of engagement from the outer, driven member.

In U.S. Pat. No. 2,224,935, a clutch arrangement for a starter motor drive is shown, wherein a rotor having four cam lobes thereon is driven by a starter motor in one direction. The cam lobes force clutch shoes apart and into driving engagement with the inside surface of a drum. The clutch is disengaged by the drum being rotated by the internal combustion or other motor at a speed faster than that at which the cam is driven. The drum will then overrun the rotor and disengage the clutch surfaces from the inside surface of the drum.

U.S. Pat. No. 2,542,323 shows a wrench having a square, horizontal cam and a wedgeable pawl engaged thereabout. The position of the pawl with respect to the central cam is controlled by a pin for allowing right hand, left hand, or no driving, and for retracting the pawl out of engagement with the driven member for return movement in the opposite direction.

U.S. Pat. No. 3,236,345 discloses a one-way clutch having a central cam and spiral surfaces extending radially inwardly in the direction of driving rotation. Clutch members are urged by springs into the engaging position, wedged between the spiral surfaces and the surrounding driven surface. In an opposite direction of rotation, the spring-loaded clutch members ratchet against the tooth surfaces of the driven member.

SUMMARY OF THE INVENTION

A one-way, non-ratcheting clutch for a double-acting agitator for a vertical-axis washing machine has a pair of clutch members thrust radially outwardly by a first cam surface and into driving engagement with an auger portion of the agitator on one direction of oscillation of a lower skirt and vane portion of the agitator. On the reverse oscillation of the lower portion, the clutch members are pulled radially inwardly by a capture surface thereon being engaged by a second cam surface. The cam oscillates with the lower portion of the agitator. The driving part of the cam is a spiral surface extending radially inwardly in the direction of rotation of the auger, while the capture surface is tilted forwardly from a radial line in the opposite, non-driving rotation direction.

THE DRAWINGS

FIG. 3 is a top plan view of the double-acting agitator of the present invention.

FIG. 4 is an enlarged, side sectional view through the upper portion of the agitator and one-way clutch mechanism.

FIG. 5 is a cross-sectional view taken on line V—V of FIG. 4 showing driving of the inner, lower agitator portion to actuate the clutch to drive the outer, upper auger portion therewith.

FIG. 6 is a sectional view similar to FIG. 5, but showing relations among the parts upon an opposite direction of oscillation of the inner, lower portion.

THE PREFERRED EMBODIMENTS

Figure 1:
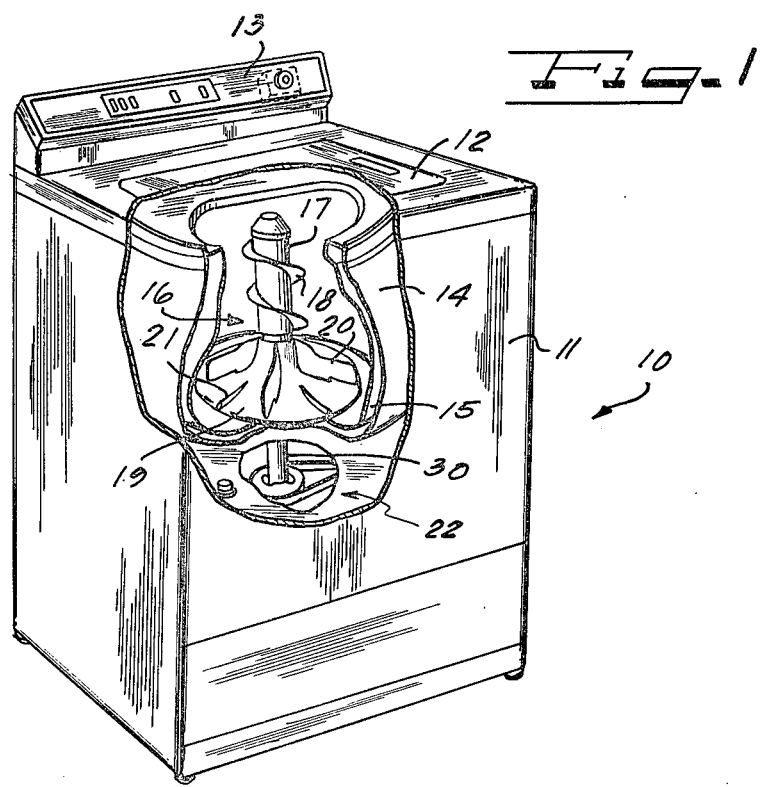
FIG. 1 is a perspective view of a washing machine embodying the present invention, with parts of the cabinet cut away to show internal features.
Figure 2:
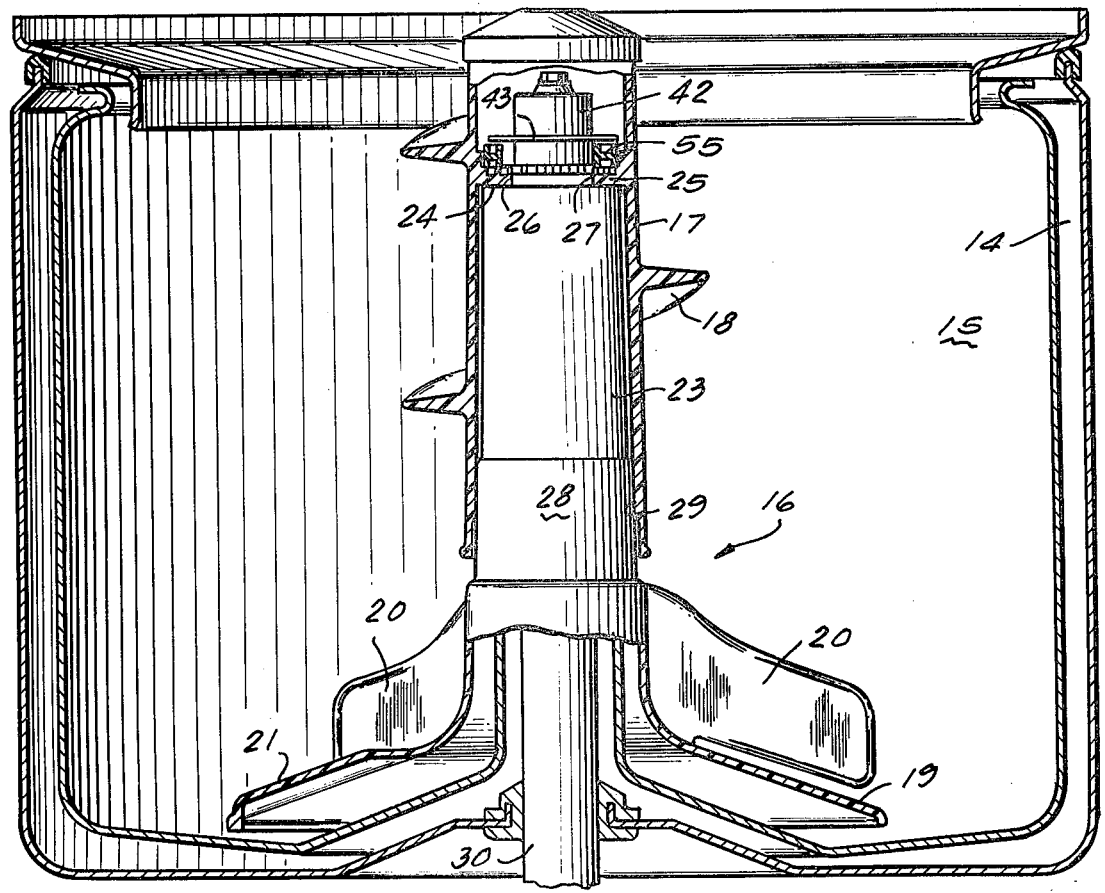
FIG. 2 is a side sectional view showing agitator internal parts.

As shown in FIG. 1, a vertical-axis washing machine 10 comprises a cabinet 11 having a top opening 12 and a control panel 13. The cabinet 11 encloses a tub 14 for containing wash liquid and a coaxial basket 15 for containing clothing and other fabric articles to be washed. Mounted within the basket 15 and also coaxially therewith is a double-acting agitator assembly 16, comprising an upper, auger portion 17 having a helical auger blade 18 thereon and a lower skirt portion 19 carrying thereon upstanding agitation vanes 20 and scrubbing vanes 21. A drive means 22 controlled by the control panel 13 drives the lower skirt portion 19 and vanes 20, 21 thereon in selected, to and fro oscillations about the vertical axis, through an upstanding barrel portion 23 of the lower agitator portion, as shown in FIGS. 2 and 4.

The auger 17 is carried on or about the upstanding barrel 23 of the agitator 16 by a shoulder 24 formed annularly about the upper part of the upstanding barrel 23. A supporting rim 25 extending radially inwardly from the auger 17 rides on the shoulder 24 for vertical support. The auger 17 is maintained in a coaxial relation to the barrel 23 by axial bearing surfaces 26 formed on the upper part of the barrel 23 and an inward annular surface 27 of the supporting rim 25. The auger 17 is also supported against cocking about the upstanding barrel 23 by a radial bearing surface 28 on a lower part of the barrel 23, bearing against an inner surface 29 of the auger 17 about its lower end.

As shown in detail in FIG. 4, and also in FIGS. 5 and 6, a drive shaft 30 of the drive means 22 extends along the axis of the agitator 16 and terminates at an upward end in splines 31 engaging in a press-fit relation to a similarly-splined surface 32 of a driven top portion 33 of the upstanding barrel 23. Thus, oscillation of the drive shaft 30 of the drive mechanism 22 oscillates the barrel 23 via the splined connections 31, 32 on the drive shaft 30 and 32 on top portion 33 of barrel 23. A bolt 34 connects the shaft 30 and top portion 33 of the barrel 23 together. Rubber sealing members 35 prevent escape of air from inside the barrel 23 about the opening therein for the bolt 34.

In accordance with the invention, the upper, driven portion 33 of the barrel 23 is formed about its outer surface with a plurality of radially and axially extending splines 40. The splines drivingly engage corresponding splines 41 in a cam cap member 42 received over the top portion 33 of the barrel 23 and secured thereto by the bolt 34. The cap 42 is formed with a radially-extending flange 43 and, below the flange 43, a pair of cam lobes 44. The cap 42, the flange 43, and the cam lobes 44 together form an oscillating cam member which rotates with the drive shaft 30, the upstanding barrel 23, the skirt 19, and the vanes 20, 21. A first direction 45 of such oscillation is depicted in FIG. 5 by the arrow, in which the auger 17 is driven in corotation with the drive shaft 30 and portion 33 of the barrel 23. A reverse direction of rotation 46 is shown in FIG. 6, where the auger 17 is disengaged from and does not rotate with the drive shaft 30 and related parts.

Each of the cam lobes 44 is formed with a first, thrusting surface 50 extending generally in a circumferential direction, and a second, capture surface 51 extending generally in a radial direction. The thrusting surface 50 comprises a spiral which proceeds radially inwardly in the direction of the driving rotation 45. The capture surface 51 is tilted forwardly in the direction of non-driving rotation 46 from a line radial to the axis of the assembly.

Carried outwardly of the cam lobes 44 are a pair of clutch shoes or members 55. Each clutch shoe 55 is retained about the cam lobe 44 in the circumferential direction, axially between the flange 43 and an upper side of the auger support rim 25 of the cap 42. The clutch shoes 55 are restrained from radially outward movement by a surrounding cylindrical engagement surface 56 formed on an inner surface of the auger barrel 17. The engagement surface 56 of the auger 17 is preferably toothed as at 57, and each clutch shoe 55 carries on a radially outer surface thereof at least one corresponding tooth 58 engageable therewith for positive driving connection. More than one tooth 58 may be provided on each shoe 55 if desired, although one is sufficient.

A radially inward part of each clutch shoe 55 is formed with a first, spiral surface 59 extending radially inwardly in the direction of driving oscillations 45, the surface 59 corresponding to the thrusting surface 50 of each cam lobe 44. It is preferred that the surfaces 50 and 59 have cooperating spacers 60 extending radially of the surfaces 50, 59, to reduce surface contact area between them to avoid sticking of the parts should they become wet in the washing machine environment. Particularly in the non-driving position of FIG. 6, a wet contact of the parts could prevent detachment and relative movement of same, preventing operation of the clutch mechanism.

Each clutch shoe 55 has a further, capture surface 61 formed on a shoulder 62 at a circumferentially forward end thereof in the direction of non-driving rotation 46. The surface 61 is aligned with the capture surface 51 of the cam lobe 44. The forward tilting of the surfaces 51, 61 in the non-driving direction 46 insures that the clutch shoes 55 are cammed radially inwardly when the drive shaft 30 and connected parts rotate in such non-driving direction. Such capture and camming action removes the teeth 58 from engagement with the teeth 57 of the auger 17. Then the only friction between the auger 17 and the upstanding barrel 23 arises between the support shoulder 24 and the support rim 25, the radial alignment and bearing surfaces 26, 27 and 28, 29, and between lower surfaces of the clutch shoe members 55 and the upper surface of the bearing rim 25 of the auger. Such friction is normally sufficient to rotate the auger 17 and blade 18 thereon in the reverse direction 46 only when very light clothing and other fabric loads are within the wash basket 15. Also, since the shoes 55 are withdrawn radially inwardly from the teeth 57 of the inner surface 56 of the auger 17, no ratcheting occurs, providing a substantially noiseless clutch action.

More than two cam lobes 44 can be provided, with a corresponding number of clutch shoe members 55, and other forms of engagement surfaces besides toothed surfaces 57, 58 may be employed. Although these and various other minor modifications may be suggested by those versed in the art, it should be understood that I wish to embody within the scope of the patent warranted hereon all such modifications as reasonably and properly come within the scope of my contribution to the art.

The embodiments of the invention in which an exclusive property or privilege is claimed are defined as follows:

1. A clutch for imparting a unidirectional rotation to an auger portion of an agitator in an automatic washing machine of the vertical-axis type, the clutch being driven by alternating oscillations of a lower portion of said agitator, the clutch comprising:
    a centrally splined cap member attached irrotatably to the lower portion of the agitator and including a cam having a cam lobe with a generally radially outward, spiral first camming surface and a second camming surface extending generally in a radial direction;
    a cylindrical, driven inner surface on said auger portion spaced radially outwardly of the cam lobe;
    a clutch shoe carried radially between the cam lobe and the driven surface, the shoe comprising:
        an outer surface engageable with the driven inner surface of the auger portion of the agitator,
        an inner spiral surface engageable with the first camming surface of the cam lobe, the inner spiral surface and the cooperating first camming surface of the cam lobe extending radially inwardly toward the axis in the circumferential direction of corotation of the auger and lower agitator portions, and
        an end surface formed at the radially outermost portion of the inner spiral surface, engageable with the second camming surface of the cam lobe upon rotation of the lower agitator in the non-auger driving direction, the end surface and the second camming surface of the cam lobe being inclined forwardly of a line radial thereto in a direction of non-driving rotation of the lower agitator portion.

2. A clutch as defined in claim 1, wherein the radial distance spacing the driven surface from the cam lobe is less than radial widths of the clutch shoe at the end surface thereof and at an opposite end thereof where the inner camming surface is radially inmost, whereby to retain the clutch shoe circumferentially about the cam lobe.

3. A clutch as defined in claim 1, wherein the driven surface of the auger portion and the outer surface of the clutch shoe are cooperatively toothed for positive engagement with one another.

4. A clutch as defined in claim 3, wherein the clutch shoe has a single tooth on the outer surface thereof.

5. A clutch as defined in claim 1, wherein the cam lobe first camming surface has a raised spacer portion adjacent the second camming surface and the inner spiral surface of the clutch shoe has at least one raised spacer portion thereon, the spacer portions spacing the surfaces apart to limit surface contact and sticking of the parts under wet conditions.

6. In an automatic washer of the vertical-axis type having a double-acting agitator, the improvement of a one-way clutch means for unidirectionally driving an auger portion of the agitator from an oscillating lower skirt and vane portion thereof upon a forward oscillation thereof and disengaging said auger from said lower portion upon a reverse oscillation thereof, the clutch means comprising:

a driving cam carried irrotatably on said skirt and vane portion and having a plurality of cam lobes thereon, each of said cam lobes having a pair of cam surfaces including a generally circumferential, spirally-extending thrusting surface and one generally radially extending capture surface;

an inwardly-facing driven surface formed on said auger portion;

a radially-extending, annular support surface carried by said auger portion and extending inwardly of said driven surface and said driving cam and spaced axially there-below;

a plurality of clutch members each corresponding to and cooperating with one of the cam lobes and carried slidably on said support surface radially between the thrusting surfaces of the cam members and the driven surface of the driven member, each of said clutch members having:

a radially outward, cylindrical drive surface selectively engageable on at least one point thereof with the driven surface upon each forward oscillation of the lower agitator portion, a radially inward thrusting surface extending spirally circumferentially and radially inwardly in the direction of the forward oscillations, and a shoulder extending generally radially inwardly from a first end of the clutch member and engageable by the capture surface of the driving cam upon each reverse oscillation of the lower agitator portion, whereby when the driving cam is rotated in the forward, drive direction, the cam lobes thereon urge the clutch members radially outwardly by cooperation of the thrusting surfaces thereon and urge the drive surfaces of the clutch members into engagement with the driven surface of the auger portion, and whereby when the driving cam is rotated in the opposite direction the capture surfaces of the cam lobes engage the shoulders of the clutch members and retract said clutch members radially inwardly to remove the driving and driven surfaces from engagement with one another, and whereby during the non-driving oscillations of the lower portion of the agitator the clutch is substantially silent.

7. In an automatic washer as defined in claim 6, the improvement thereof wherein the driven surface of the auger portion and the drive surfaces of the clutch members comprise cooperable serrations or teeth.

8. In an automatic washer as defined in claim 6, the improvement thereof wherein each of the clutch members has only a single tooth or serration.

9. In an automatic washer as defined in claim 6, the improvement thereof wherein the thrusting surfaces of the cam lobes and the cooperable thrusting surfaces of the clutch members include relatively recessed portions not contactable together, whereby to avoid sticking of the cooperable surfaces together under conditions of wetness.

10. In an automatic washer as defined in claim 6, the improvement of clutch means therein, wherein each of the capture surfaces and the shoulders are flat or planar and are inclined forwardly with respect to the non-driving direction of rotation in the radially outward direction, whereby positively to cam the clutch members away from the driven surface upon such non-driving rotation.

* * * * *